United States Patent [19]
Bonami et al.

[11] 3,797,070
[45] Mar. 19, 1974

[54] METHOD AND APPARATUS FOR SEGMENTING EXTRUDED PRODUCT

[75] Inventors: Ernest Bonami, Western Springs; Ogden A. Clemens, Chicago, both of Ill.

[73] Assignee: Swift & Company, Chicago, Ill.

[22] Filed: May 1, 1972

[21] Appl. No.: 249,160

[52] U.S. Cl. .................................................. 17/32
[51] Int. Cl. ............................................. A22c 7/00
[58] Field of Search ........................... 17/32; 83/488

[56] References Cited
UNITED STATES PATENTS
2,822,570  2/1958  Pascale ................................... 17/32
1,418,104  5/1922  Spiselman ............................. 83/488

Primary Examiner—Robert Peshock
Attorney, Agent, or Firm—Edward T. McCabe; Charles E. Bouton; W. C. Davis

[57] ABSTRACT

Extruded product is uniformly segmented by severing with a rotating knife blade which is moved in transverse reciprocating strokes across the stream of product while simultaneously moved longitudinally in the direction of extrusion and wherein the direction of rotation of the knife blade is reversed for each transverse stroke.

16 Claims, 4 Drawing Figures

METHOD AND APPARATUS FOR SEGMENTING EXTRUDED PRODUCT

This invention relates to an improved method and apparatus for segmenting extruded product; and more particularly relates to a method and apparatus for severing continuously extruded meat products.

There are many products that are at least initially formed by being extruded through a nozzle of some type and require periodic severing into appropriate units. Often it is advantageous to sever the material on the fly. That is the cutting mechanism is moved longitudinally with the extruded material so as to make a true transverse (or perpendicular) cut. Prior inventions have provided for swinging pendulum-like, or otherwise reciprocating, a knife-means, such as a rotary knife, from side to side across the path of the extruded material. However this has often resulted in the product being moved transversely with the knife during its cutting stroke. Also where a rotary knife has been used the alternate cutting sweeps have resulted in alternate upward and downward thrust being imparted to the product due to the motion of the portion of the knife-edge first severing the product.

In some applications the transverse movements imparted to the product by the cutting member are of great disadvantage. Where the segmented units of product are to undergo further processing the resultant misalignment may cause problems. Furthermore if the extruded product, at the point of severing, is somewhat soft and plastic the product may be deformed in an irregular and unacceptable manner.

Accordingly it is an object of the present invention to provide an improved method and apparatus for segmenting extruded product with a minimum amount of displacement and/or deformation being imparted to the product.

Basically the present method contemplates the severing of a stream of extruded product with a rotating circular knife blade which is moved in transverse strokes through the product stream while the knife blade is concurrently moved in the direction of extrusion. It is essential that for each transverse movement the direction of rotation of the knife blade is reversed so that the sense of movement of that portion of the blade first severing the stream of product on each transverse stroke will be the same, and preferably will be in a downward direction with respect to the product.

An apparatus devised to perform the foregoing method comprises a severing means in conjunction with an extruding means wherein the severing means is mounted for both transverse and longitudinal movement with respect to the path of extrusion; and wherein the severing means includes a rotatable circular knife blade which is powered by a reversible power means.

Further objects and advantages of the present invention will become apparent upon reading the following detailed description of a preferred embodiment in conjunction with the drawings wherein.

Figure 1:
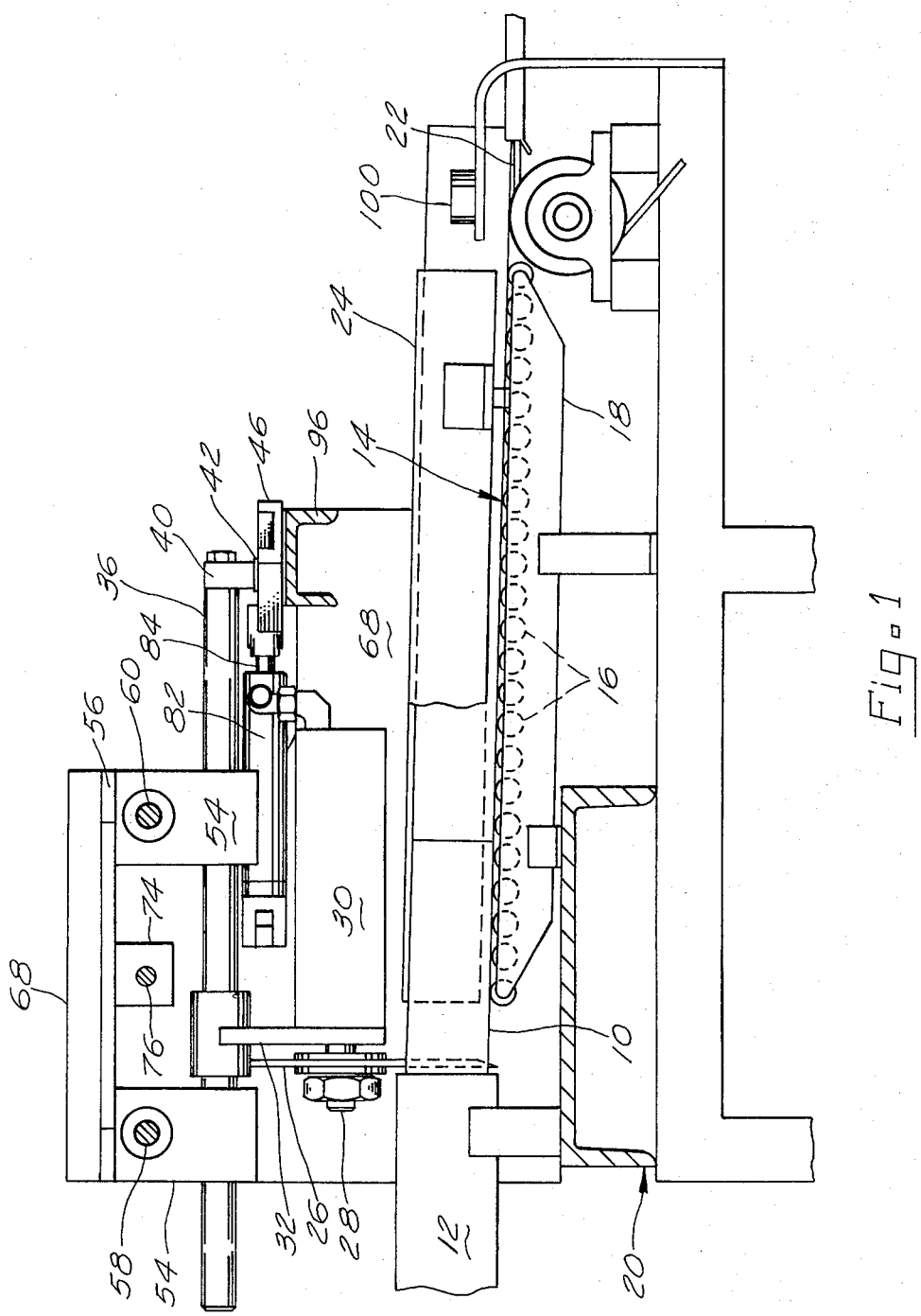
FIG. 1 is an overall side view of an apparatus according to the present invention, partially in section.

The preferred application and embodiment of the present invention was devised in connection with the meat packing industry for the purpose of severing continuously extruded ground meat into uniform length logs. In that particular application the segmented meat logs are further processed to produce a plurality of meat patties. The further processing includes transporting the individual meat logs through chilling and tempering equipment wherein a condition of hardness is achieved that facilitates subsequent slicing of the logs into patties of individual serving size. In this processing it is important that the dimensions of the extruded log be accurately maintained and that the logs be protected from deformation along any side or end so that the resultant patties are uniform and accurate. Accordingly it is important that the soft plastic extruded meat not be flattened, bent or stretched to any significant degree.

Accordingly in the improved method of the present invention the ground meat product is continuously extruded in a stream that is received upon a freely movable means that does not significantly alter the movement imparted to the stream by the extrusion equipment. At intervals of time the continuous stream of product is severed beginning at a point closely adjacent the discharge end of the extrusion nozzle. Severing of the product is accomplished with a transverse stroke, with respect to the direction of movement of the extruded product, of a rotating circular knife blade. Concurrently with the transverse stroke of the knife blade the latter is moved longitudinally, in the direction of extrusion, so that the line of severance is substantially transverse of the stream of product. Accordingly the next cutting stroke will be in the opposite transverse direction, with respect to the extruded stream of product, and thus the rotating knife blade is retracted longitudinally between strokes to a position closely adjacent the nozzle discharge end. Before commencing each transverse stroke the direction of rotation of the circular knife blade is reversed. This results in the cutting motion of that portion of the circular blade that actually severs the product, being in the same direction (generally upwardly or downwardly) with each stroke of the knife blade across the product. Preferably the cutting motion of the blade is downwardly toward the support of the extruded product.

Inertia of the severed segment and forward movement of the following extrusion, will tend to maintain its movement in the direction of extrusion, and it is kept free of any additional physical urging in that direction until it has been fully severed from the continuous stream. Thereafter it is progressively engaged and propelled forwardly in substantially the same direction to further processing.

Preferably the transverse cutting strokes of the knife blade are initiated by sensing the forward edge of a completely severed segment at a point spaced from the extrusion nozzle a distance greater than the length of the severed log. This may be accomplished with a device that detects the space between segments and the leading edge of a segment.

Preferably the segments of product are cut to uniform lengths by extruding the continuous stream at a uniform linear rate and initiating the transverse strokes of the knife blade at equal intervals of time. Once this sequence is started it can also be controlled in a uniform manner by detecting the leading edges of successive segments as above-described. Then even with minor variations in the rate of linear extrusion, compensation in the intervals of time between cutting strokes will be automatically accommodated.

Also it is preferable to longitudinally move the cutting blade during each transverse stroke at the same rate of speed as the rate of extrusion. This will result in the product being severed perpendicular to its longitudinal axis.

Figure 2:
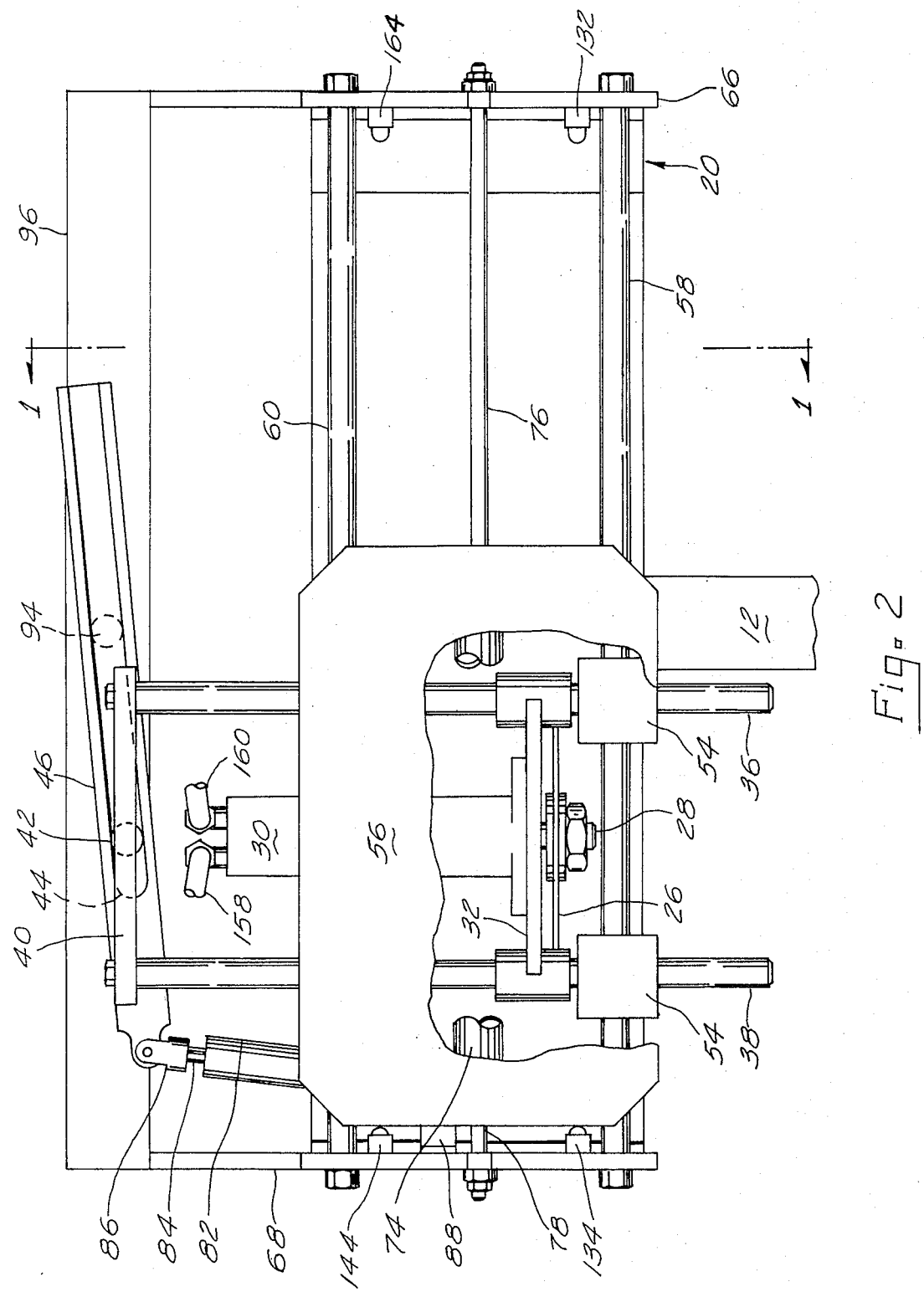
FIG. 2 is a detailed plan view of a portion of the apparatus of FIG. 1.
Figure 3:
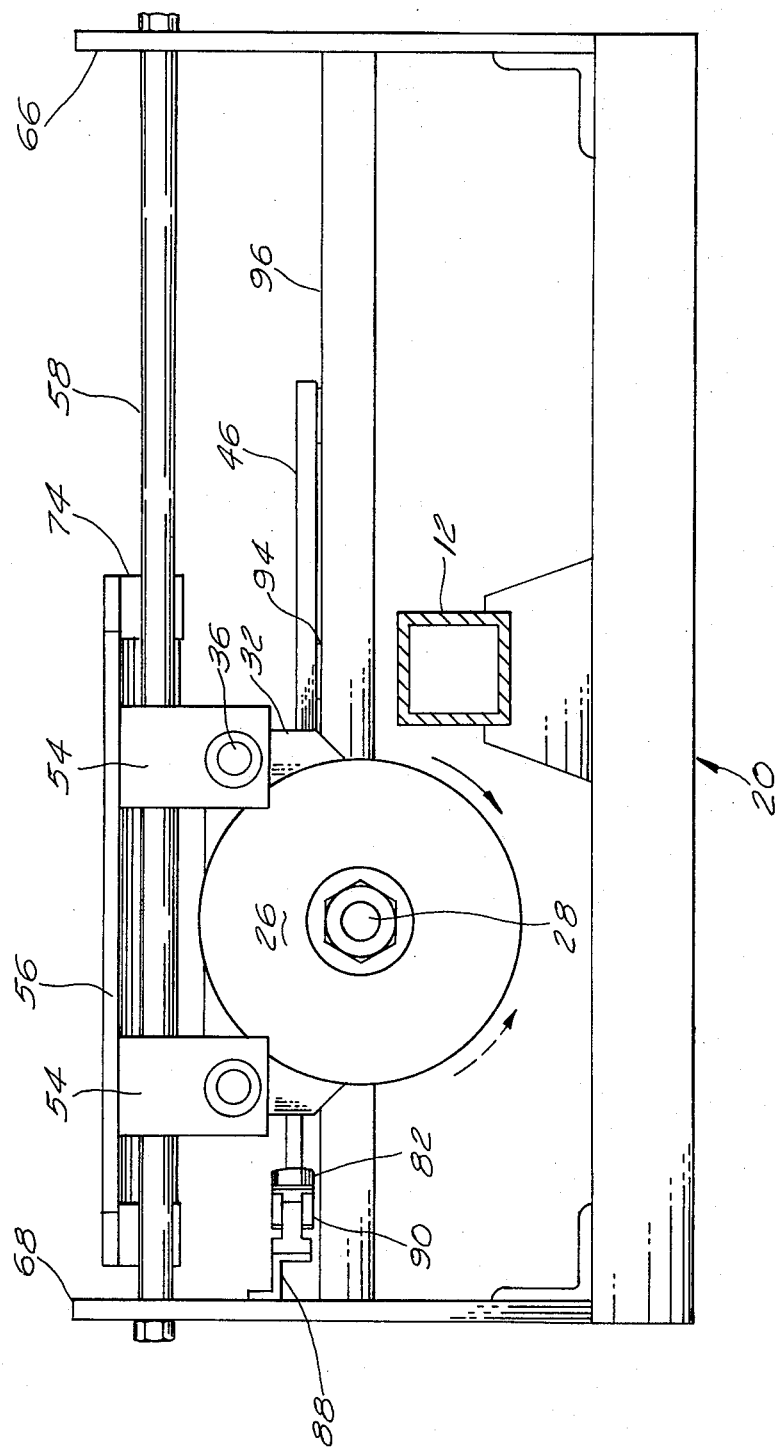
FIG. 3 is a detailed end elevation of that portion of the apparatus shown in FIG. 2.

A preferred device for accomplishing the foregoing method is shown in FIGS. 1 through 3. In FIG. 1 meat logs 10 are shown to be continuously extruded from a nozzle 12 onto a freely moving means generally 14 which is preferably comprised of a plurality of idler rolls 16 mounted cross-wise to the direction of extrusion and being rotatably journalled in a pair of side plates 18. The side plates 18 are, in turn, supported above a frame generally 20. Preferably the freely moving means generally 14 is mounted to provide a declining path from the end of nozzle 12 to a point some distance therefrom where one end of a powered conveyor belt 22 is coextensively located. Said distance should be at least slightly greater than the maximum length product unit to be severed by the device. Also by providing a downwardly inclined freely moving path each severed meat log end will continue to move forwardly at essentially the speed of extrusion until its forward end rests upon the powered conveyor belt 22 whereupon it will be progressively drawn thereon at the speed of the conveyor belt. Preferably the conveyor belt 22 is operated to move the upper run thereof forwardly at a speed slightly in excess of the extrusion rate from nozzle 12 so as to subsequently increase the space between segmented meat logs 10.

A guide rail 24 may also be provided slightly to one side of the nozzle 12 and extending substantially the length of the freely moving means generally 14 so as to assist in directing the meat logs 10 onto the powered conveyor belt 22.

A circular knife blade 26 is secured to a shaft 28 of an air motor 30 or other quickly reversible rotary power means. The knife shaft 28 is at a level slightly above the nozzle 12 and the circular knife blade 26 is of a diameter sufficient to extend fully across the height of nozzle 12.

The knife shaft 28 is journalled through a vertical mounting bracket 32 to which one end of the air motor 30 is secured. This provides a longitudinally movable means which is in turn secured to a pair of horizontal longitudinal slide rods 36, 38. The longitudinal slide rods 36, 38 are connected together, at one end, with a cross-piece 40 from which depends a cam follower 42 that is seated to ride within a slot 44 of a pivotable bar 46, which is more fully described hereinafter.

Each of the longitudinal slide rods 36, 38 is reciprocably held in pairs of bearing blocks 54. Thus a total of four bearing blocks 54 are secured to the underside of a carriage plate 56 which comprises a transversely movable means. The longitudinal slide rods 36, 38 slidably extend through the lower portions of the bearing blocks 54; and at a slightly higher level in the bearing blocks 54 transverse passageways are provided to slidably receive a pair of transverse slide rods 58, 60. The latter transverse slide rods 58, 60 extend cross-wise, with respect to the path of extrusion, between a pair of side plates 66, 68 which extend vertically above the frame 20. The ends of each transverse slide rod 58, 60 are securely fastened by nuts, or the like, to each of the side plates 66, 68. A reciprocable transverse power means preferably comprising a double acting pneumatic cylinder 74 is secured transversely to the carriage plate 56. The cylinder 74 may be mounted either above or below the plate 56 although the latter is shown in the figures. Piston rods 76, 78 extend from opposite ends of the cylinder 74 from a common piston therein (not shown) and each is fastened at its free end to a respective side plate 66, 68. Thus actuation of the double acting cylinder 74 will cause the carriage plate 56 to be drawn in one transverse direction or the other (with respect to the path of extrusion) on transverse slide rods 58, 60. Thus the entire assembly of longitudinally movable means including longitudinal slide rods 36, 38 mounting bracket 32, air motor 30 and knife blade 26 will be carried on transverse strokes across the discharge end of nozzle 12. However it will be seen that the latter assembly is mounted to also be movable longitudinally (with respect to the extrusion path) beneath the carriage plate 56.

Accordingly a reciprocable longitudinal power means, preferably including a pnuematic cylinder 82, is connected to move the latter assembly. A piston rod 84 extending from the pneumatic cylinder 82 is connected by a clevis 86 to the pivotal bar 46. The opposite end of the pneumatic cylinder 82 is pivotably fastened to a mounting bracket 88, which is welded to a side plate 68, by a mounting clevis 90. The pivotable bar 46 swings on a pivot pin 94 that is fastened to a cross bar 96 extending between the side plates 66, 68. The piston rod 84 may be either extended from the pneumatic cylinder 82 or withdrawn therein and the pivotable bar 46 will be movable between two positions at angles to the transverse strokes. Thus the cam follower 42 will pull cross piece 40 and hence air motor 30 and knife blade 26 forwardly in the direction of extrusion while the carriage 56 is being moved transversely; and the cross piece 40 will be quickly retracted when the cylinder 82 is actuated in either direction.

Figure 4:
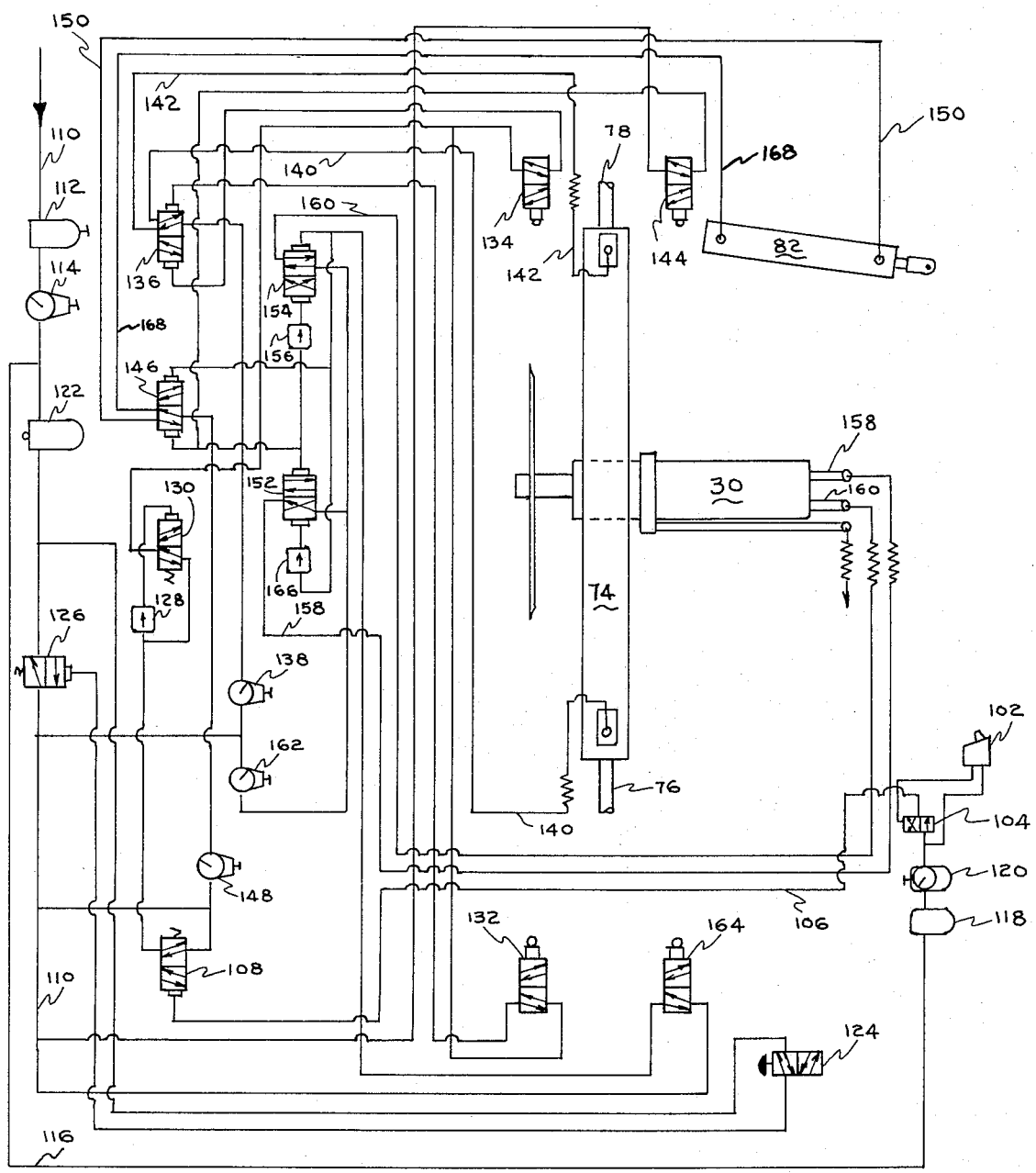
FIG. 4 is a pneumatic control diagram for the apparatus of FIGS. 1-3.

Both pneumatic cylinders 74 and 82 are connected through suitable tubing, valves and the like such as by the control circuit shown in FIG. 4, to a source of pressurized air (not shown). Energizing of the pneumatic cylinders is preferably initiated by a sensing means such as a pneumatic sensing unit 102 which is mounted on a suitable bracket at about the end of the powered conveyor belt 22 adjacent the freely moving means generally 24. The pneumatic sensing unit 102 emits a steady low pressure stream of air toward the extruded logs 10. When a space between logs occurs the change in back pressure will cause a position change on a cutter valve 104, and when the leading edge of a log 10 interrupts the stream of air a pneumatic signal will be sent from valve 104 through a line 106 to a pilot valve 108 whence the apparatus is automatically cycled.

As may be followed in FIG. 4, pressurized air at about 90 psi is supplied through main line 110 where it passes through a filter 112 and a pressure regulator 114 which reduces the pressure slightly to about 80 psi. A pipe line 116 supplies dry filtered air to the cutter valve 104 and pneumatic sensor 102 through an additional filter 118 and 35 psi regulator 120. The main supply line 110 continues through a lubricator 122 and is connected through various valves as hereinafter explained.

An emergency valve 124 is connected to normally supply a pilot signal to hold open a main line valve 126 through which all air must pass to the remaining parts of the circuit. If the emergency valve 124 is closed the valve 126 will also close and thereby disconnect the circuit.

For purposes of explanation assume the apparatus is in the condition shown in FIG. 2. When the signal is received at pilot valve 108 pressurized air will be directed through a time delay element 128 to shift a valve 130 which, in turn, briefly directs the pressurized air to a pair of valves 132, 134 located on side plates 66, 68, respectively, and which are alternately operable by contact of the carriage plate 56. In the position shown the valve 134 will be held open by carriage plate 56 to connect the pressurized air to one pilot of a valve 136, thereby causing the valve 136 to shift and connect and hold pressurized air from another regulator 138 to a line 140 leading to one end of cylinder 74, so as to propel the carriage 56 toward the copposite side plate 66. (The corresponding valve 132, when contacted by carriage plate 56, will connect a signal path to an opposite pilot on valve 136 so as to enable the valve 136 to be moved oppositely to connect and hold pressurized air to a line 142 leading to the opposite end of cylinder 74 upon a new signal from valve 104 being received at pilot valve 108.)

At the same time that carriage plate 56 moves valve 134, it also moves an adjacent valve 144 to connect pressurized air to one pilot of a valve 146, thereby causing the valve 146 to shift and direct air from a regulator 148 through a line 150 to one end of cylinder 82, which pivots the bar 46 and causes the longitudinal moving means and air motor 30 to be quickly retracted to a position adjacent the nozzle 12. Thus when the carriage 56 commences to move toward side plate 66 the cam follower 42 will move in the slot 44 and pull the cross piece 40 (and air motor 30 connected thereto) forwardly. The distance of longitudinal (forward) movement may be regulated by limiting the throw of the piston rod 84 of cylinder 82 so that with each transverse stroke the knife will be moved longitudinally the same distance moved by the extruded log.

The valve 144 also actuates pilots of valves 152 and 154, the latter being delayed by a time delay element 156. Valves 152 and 154 are connected by lines 158 and 160, respectively, to the air motor 30 and both valves are connected through a regulator 162 to the main air line 110. This reverses the rotation of motor 30 and knife blade 26 by disconnecting the pressurized air from line 158 and, after a very slight delay, connecting the pressurized air to line 160. (The corresponding valve 164 at side plate 66 will reverse the foregoing conditions when contacted by the carriage plate 56, by immediately actuating opposite pilots on valves 146 and 154 and after a slight delay through delay element 166, an opposite pilot of valve 152. Valve 146 will shift to direct pressurized air through a line 168 to an opposite end of cylinder 82, thereby pivoting bar 46 to retract motor 30; and valves 154 and 152 first disconnect pressurized air to line 160 and then connect it to line 158 again reversing motor 30.)

Obviously many modifications and variations of the invention as hereinbefore set forth may be made without departing from the spirit and scope thereof, and, therefore, only such limitations should be imposed as are indicated in the appended claims.

We claim:

1. An improved method for segmenting an extrusion of product, said method comprising: extruding the product in a given direction; severing said stream of product with a rotating circular knife blade, said knife blade being moved in transverse strokes through said stream of product alternately in first and opposite directions; moving said blade in said given direction while being moved in each transverse stroke; retracting said blade in the opposite of said given direction between each said transverse stroke; and reversing the rotation of said circular knife blade for each said transverse stroke.

2. The method according to claim 1 wherein the rotation of said circular knife blade is reversed for each transverse stroke so that the portion of the knife blade first severing said stream of product will be moving downwardly with respect thereto.

3. The method of claim 1 wherein the product is extruded in a continuous stream.

4. The method of claim 3 wherein the continuous stream of product is extruded at a uniform linear rate and wherein the knife blade is moved in said given direction at said rate while being moved in each transverse stroke.

5. The method of claim 1 wherein each severed segment of product is removed in said given direction.

6. The method of claim 5 wherein each segment of product is removed by first continuing movement thereof in said given direction after being severed from the extruded stream on freely moving means that does not tend to significantly alter said movement, and then progressively drawing said segment from said freely moving means onto powered conveying means.

7. The method of claim 1 wherein the extruded product is ground meat.

8. An improved apparatus for segmenting an extrusion of product, said apparatus comprising: extruding means mounted to extrude a stream of product in a given direction; severing means mounted above and beyond said extruding means, said severing means including a circular knife blade rotatable in a plane transverse to said given direction; transverse moving means supporting said severing means and reciprocable to carry said circular knife blade in transverse strokes through said stream of product alternately in first and opposite directions; longitudinal moving means supporting said severing means and reciprocable to carry said circular knife blade in said given direction while said blade is reciprocated transversely in each of said first and opposite directions, said longitudinal moving means being retractable between each of said transverse strokes; and reversible power means attached to rotate said circular knife blade.

9. The apparatus of claim 8 including means to reverse said reversible power means for each transverse stroke whereby the portion of the knife blade first severing the stream of product will move in the same sense with respect thereto during each stroke.

10. The apparatus of claim 8 including a freely moving means extending in said direction beneath and beyond said extruding means for removing product therefrom.

11. The apparatus of claim 10 including powered conveying means extending beyond said freely moving means whereby to progressively draw a severed segment of product from said freely moving means.

12. The apparatus of claim 11 wherein the freely moving means is a plurality of idler rollers mounted transversely to said given direction and declining from said extruding means.

13. The apparatus of claim 10 wherein said freely moving means extends a length at least equal to the desired length of a segment of product and including sensing means mounted adjacent said freely moving means at least said length from said extruding means, said sensing means connected to actuate a reciprocable power means drivingly connected to said transverse moving means.

14. The apparatus of claim 8 wherein the transverse moving means is a carriage slidably mounted on a pair of transverse rods; and said longitudinal moving means includes a pair of longitudinal rods reciprocably supported from said carriage.

15. The apparatus of claim 14 wherein the reversible power means is an air motor secured between said longitudinal rods.

16. The apparatus of claim 14 wherein longitudinal moving means is reciprocable by a follower mounted to slide in a pivotable bar said bar being connected to a reciprocable power means.

* * * * *